US010393866B1

(12) United States Patent
Kravets et al.

(10) Patent No.: US 10,393,866 B1
(45) Date of Patent: Aug. 27, 2019

(54) DETECTING PRESENCE BASED ON WIRELESS SIGNAL ANALYSIS

(71) Applicant: Cognitive Systems Corp., Waterloo (CA)

(72) Inventors: Oleksiy Kravets, Petersburg (CA); Yunfeng Piao, Kitchener (CA)

(73) Assignee: Cognitive Systems Corp., Waterloo, Ontario (CA)

( * ) Notice: Subject to any disclaimer, the term of this patent is extended or adjusted under 35 U.S.C. 154(b) by 0 days.

(21) Appl. No.: 15/935,972

(22) Filed: Mar. 26, 2018

(51) Int. Cl.
*G01S 13/00* (2006.01)
*G01S 13/04* (2006.01)

(52) U.S. Cl.
CPC ............ *G01S 13/04* (2013.01); *G01S 13/003* (2013.01)

(58) Field of Classification Search
CPC ................................ G01S 13/04; G01S 13/003
USPC ........................................................... 342/28
See application file for complete search history.

(56) References Cited

U.S. PATENT DOCUMENTS

| 4,054,879 | A | 10/1977 | Wright et al. |
| 4,649,388 | A | 3/1987 | Atlas |
| 4,740,045 | A | 4/1988 | Goodson et al. |
| 5,270,720 | A | 12/1993 | Stove |
| 5,696,514 | A | 12/1997 | Nathanson et al. |
| 6,075,797 | A | 6/2000 | Thomas |
| 6,573,861 | B1 | 6/2003 | Hommel et al. |
| 7,652,617 | B2 | 1/2010 | Kurtz et al. |
| 8,660,578 | B1 | 2/2014 | Yang et al. |
| 9,030,321 | B2 | 5/2015 | Breed |
| 9,523,760 | B1 | 12/2016 | Kravets et al. |
| 9,524,628 | B1 | 12/2016 | Omer et al. |
| 9,551,784 | B2 * | 1/2017 | Katuri .................. G01S 13/003 |
| 9,584,974 | B1 | 2/2017 | Omer et al. |
| 9,743,294 | B1 | 8/2017 | Omer et al. |
| 9,869,759 | B2 * | 1/2018 | Furuskog ................ G01S 13/04 |
| 9,927,519 | B1 | 3/2018 | Omer et al. |
| 9,933,517 | B1 | 4/2018 | Olekas et al. |
| 9,989,622 | B1 | 6/2018 | Griesdorf et al. |

(Continued)

FOREIGN PATENT DOCUMENTS

| CA | 2834522 | 5/2014 |
| CA | 2945702 | 8/2015 |

(Continued)

OTHER PUBLICATIONS

Dekker, et al., "Gesture Recognition with a Low Power FMCW Radar and a Deep Convolutional Neural Network", Proceedings of the 14th European Radar Conference, Nuremberg, Germany, Oct. 11-13, 2017, 4 pgs.

(Continued)

*Primary Examiner* — Frank J McGue
(74) *Attorney, Agent, or Firm* — Henry Patent Law Firm PLLC

(57) ABSTRACT

In a general aspect, a monitoring system detects presence of an object in a space, e.g., when no motion is detected. Motion of an object in a space is detected by analyzing a first set of signals based on wireless signals transmitted in a first time period. Lack of motion in the space is detected by analyzing a second set of signals based on wireless signals transmitted in a second, subsequent time period. Whether the object was present in the space during the second time period is detected by analyzing the second set of signals.

28 Claims, 7 Drawing Sheets

(56) References Cited

U.S. PATENT DOCUMENTS

| | | | |
|---|---|---|---|
| 10,004,076 B1 | 6/2018 | Griesdorf et al. | |
| 2003/0108119 A1 | 6/2003 | Mohebbi et al. | |
| 2006/0152404 A1* | 7/2006 | Fullerton | G01S 7/414 342/28 |
| 2006/0284757 A1* | 12/2006 | Zemany | G01S 13/32 342/22 |
| 2007/0296571 A1 | 12/2007 | Kolen | |
| 2008/0119130 A1 | 5/2008 | Sinha | |
| 2008/0240008 A1 | 10/2008 | Backes et al. | |
| 2008/0303655 A1 | 12/2008 | Johnson | |
| 2009/0062696 A1 | 3/2009 | Nathan et al. | |
| 2010/0130229 A1 | 5/2010 | Sridhara et al. | |
| 2010/0315284 A1 | 12/2010 | Trizna et al. | |
| 2012/0115512 A1 | 5/2012 | Grainger et al. | |
| 2012/0146788 A1 | 6/2012 | Wilson et al. | |
| 2013/0113647 A1* | 5/2013 | Sentelle | G01S 13/32 342/22 |
| 2013/0162459 A1 | 6/2013 | Aharony et al. | |
| 2013/0283256 A1 | 10/2013 | Proud | |
| 2014/0135042 A1 | 5/2014 | Buchheim et al. | |
| 2014/0247179 A1 | 9/2014 | Furuskog | |
| 2014/0286380 A1 | 9/2014 | Prager et al. | |
| 2014/0361920 A1* | 12/2014 | Katuri | G01S 13/04 342/28 |
| 2015/0043377 A1 | 2/2015 | Cholas et al. | |
| 2015/0063323 A1 | 3/2015 | Sadek et al. | |
| 2015/0078295 A1 | 3/2015 | Mandyam et al. | |
| 2015/0098377 A1 | 4/2015 | Amini et al. | |
| 2015/0195100 A1 | 7/2015 | Imes et al. | |
| 2015/0245164 A1 | 8/2015 | Merrill | |
| 2015/0309166 A1* | 10/2015 | Sentelle | G01S 13/32 342/22 |
| 2015/0338507 A1 | 11/2015 | Oh et al. | |
| 2016/0018508 A1 | 1/2016 | Chen et al. | |
| 2016/0183059 A1 | 6/2016 | Nagy et al. | |
| 2016/0187475 A1 | 6/2016 | Horng et al. | |
| 2016/0210838 A1 | 7/2016 | Yan et al. | |
| 2017/0042488 A1 | 2/2017 | Muhsin | |
| 2017/0146656 A1 | 5/2017 | Belsley et al. | |
| 2017/0278374 A1 | 9/2017 | Skaaksrud | |
| 2017/0280351 A1 | 9/2017 | Skaaksrud | |
| 2017/0311279 A1 | 10/2017 | Allegue Martinez et al. | |
| 2017/0343658 A1 | 11/2017 | Ramirez et al. | |

FOREIGN PATENT DOCUMENTS

| | | |
|---|---|---|
| WO | 2014/021574 | 2/2014 |
| WO | 2014/201574 | 12/2014 |
| WO | 2015/168700 | 11/2015 |
| WO | 2016/066822 | 5/2016 |
| WO | 2016/110844 | 7/2016 |
| WO | 2017/106976 | 6/2017 |
| WO | 2017/132765 | 8/2017 |
| WO | 2017/210770 | 12/2017 |
| WO | 2018/094502 | 5/2018 |

OTHER PUBLICATIONS

Youssef, Moustafa, et al., "Challenges: Device-free Passive Localization for Wireless Environments", Mobicom 07 Proceedings of the 13th Annual ACM International Conference on Mobile Computing and Networking, Sep. 2007, 31 pgs.

WIPO, International Search Report and Written Opinion dated Dec. 13, 2018, in PCT/CA2018/051114, 9 pgs.

Kosba, et al., "Robust WLAN Device-free Passive Motion Detection", IEEE Wireless Communications and Networking Conference, Apr. 2012, 6 pgs.

* cited by examiner

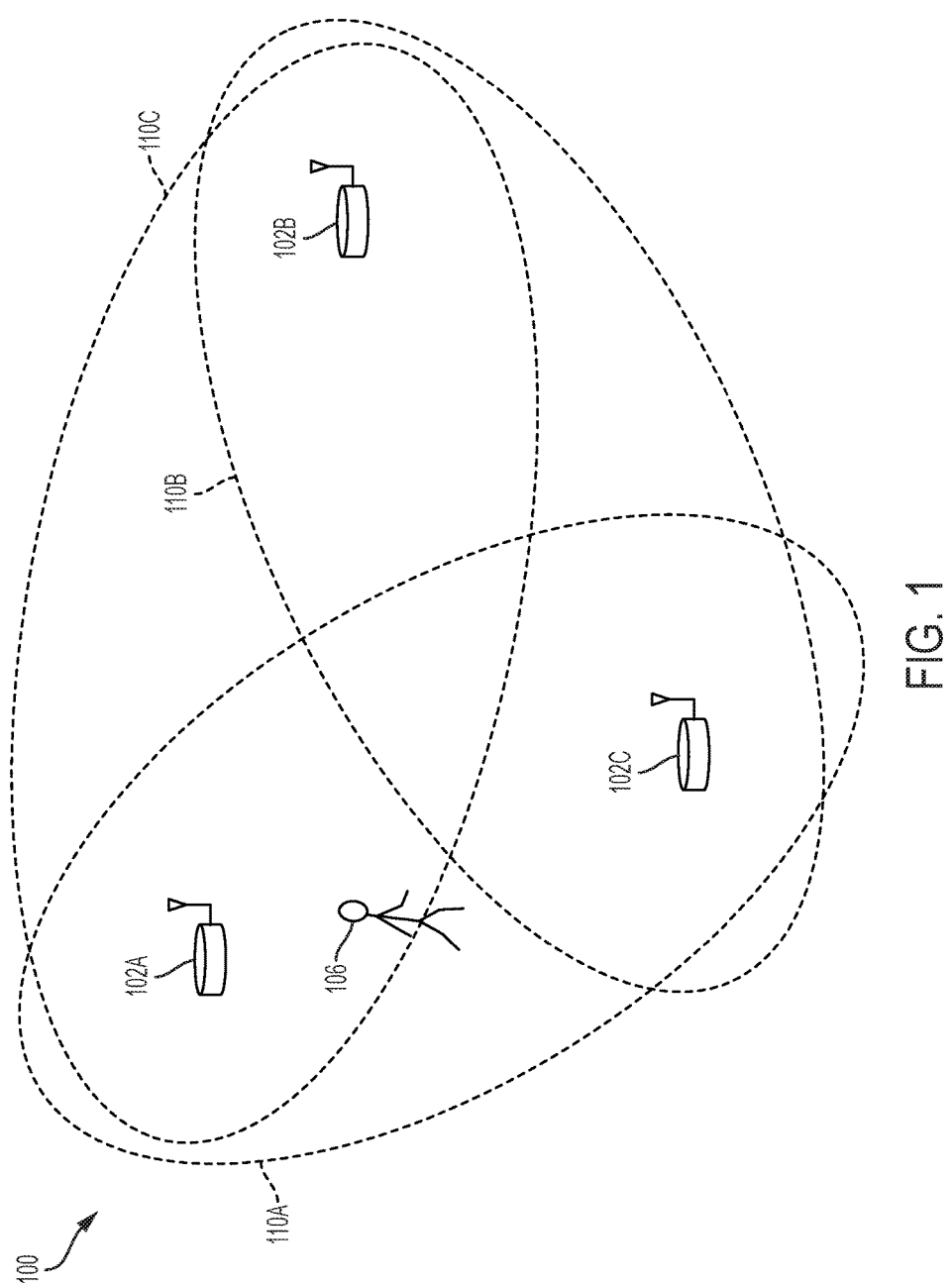

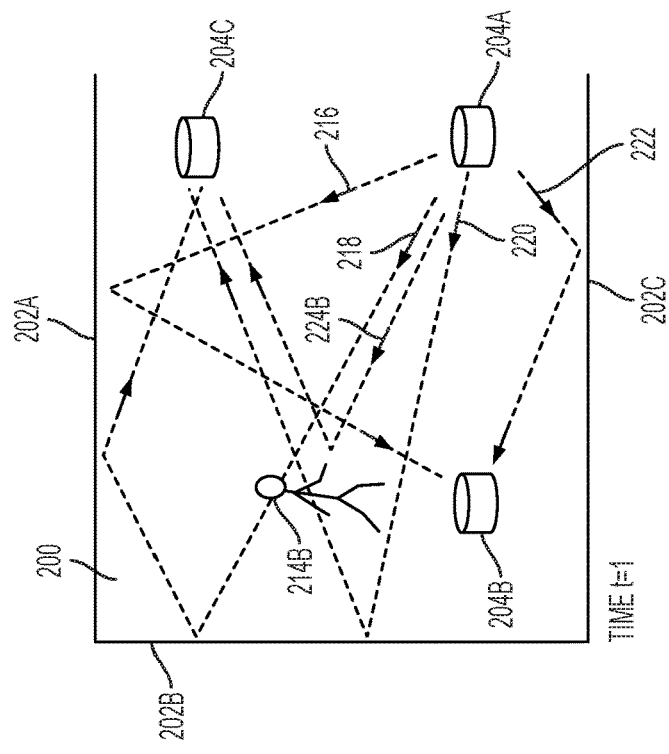
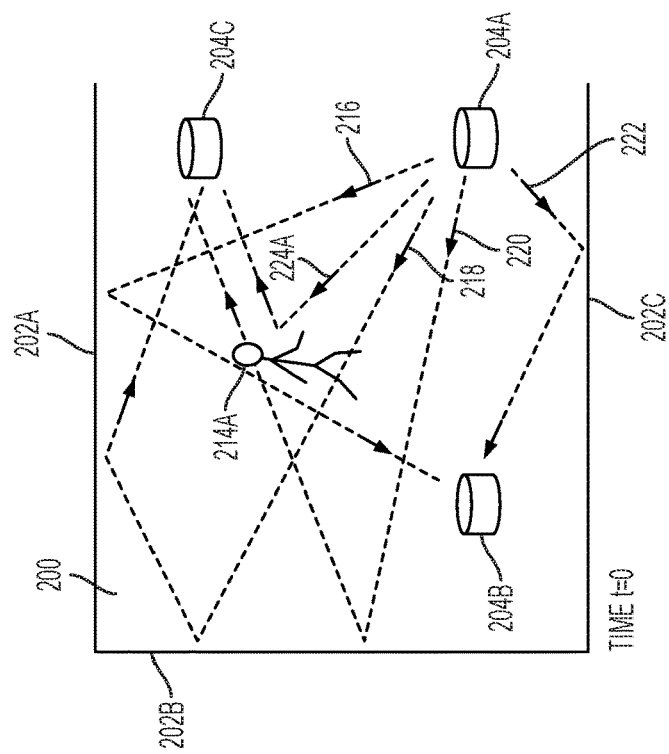
FIG. 2A
FIG. 2B

DETECTING PRESENCE BASED ON WIRELESS SIGNAL ANALYSIS

BACKGROUND

The following description relates to detecting presence of an object in a space based on wireless signals.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DESCRIPTION OF DRAWINGS

FIG. 1 is a diagram showing an example wireless communication system.

FIGS. 2A-2D are diagrams showing example wireless signals communicated between wireless communication devices in a monitoring system.

DETAILED DESCRIPTION

Figure 2D:
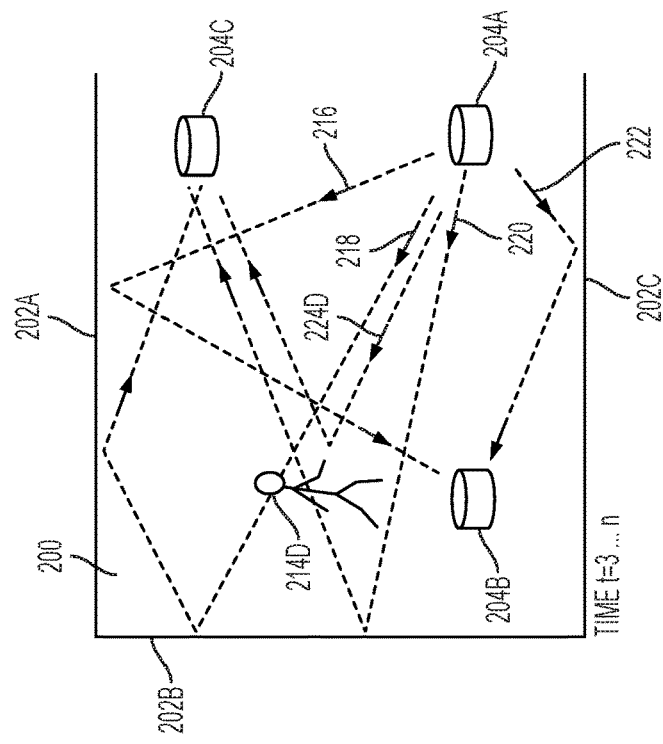

As an overview, a monitoring system may be configured to detect motion in a space based on changes in wireless signals transmitted through the space over a communication channel. For example, a person may enter or walk through the space, and the monitoring system may detect the person's movement based on changes to the wireless signals. Subsequently, the monitoring system may stop detecting movement of the person, such as, when the wireless signals are not changing, or are not changing enough, to indicate movement, e.g. detecting lack of motion. It is also advantageous to have a presence detection aspect of the monitoring system that is able to determine the presence of an object, e.g. a person, in a space even when motion of the object is not detectable by the motion detection aspect of the monitoring system, thereby determining whether the space is occupied. It is also advantageous to determine if the object, e.g. the person, is no longer present in the space. For example, it would be advantageous for monitoring systems, such as alarm systems, motion detection systems, protection systems, personal monitoring systems, etc., to determine whether an intruder is in the house, whether someone has fallen and needs assistance. In some cases, it may be advantageous, e.g. for businesses, to otherwise determine, in certain other situations, the occupancy of a room, building, or other space, such as, for power management of the premises or property. For example, the lights, air conditioning, heat, etc. may be adjusted for parts of a building that are not occupied.

Aspects of the present disclosure may provide additional advantages in some instances. For example, presence or absence of an object when lack of motion is detected in a space may be determined based on wireless signals without the need for a line-of-sight between devices. In some cases, presence or absence of an object when no motion is detected, may be determined using features of existing wireless communication devices and networks. Presence or absence of an object when no motion is detected, according to aspects of the present disclosure may further improve the operation of monitoring and alarm systems, making them more accurate and useful in assessing occurrences and accurately determining a status of the space, e.g. occupied or non-occupied, and may also provide other technical improvements to the operation of monitoring and alarm systems.

In some aspects of what is described here, the presence or absence of an object in a space, e.g. whether a space is occupied or non-occupied, when lack of motion is detected, may be detected using information from multiple wireless communication devices communicating in the space.

For instance, wireless signals received at each of the wireless communication devices in a wireless communication network may be analyzed to determine channel information for the different communication links in the network (between respective pairs of wireless communication devices in the network). The channel information may be representative of a physical medium that applies a transfer function to wireless signals that traverse the space. In some instances, the channel information includes channel response information. Channel response information may refer to known channel properties of a communication link, and may describe how a wireless signal propagates from a transmitter to a receiver, representing the combined effect of, for example, scattering, fading, and power decay within the space between the transmitter and receiver. In some instances, the channel information includes beamforming state information. Beamforming (or spatial filtering) may refer to a signal processing technique used in multi antenna (multiple-input/multiple-output (MIMO)) radio systems for directional signal transmission or reception. Beamforming can be achieved by combining elements in an antenna array in such a way that signals at particular angles experience constructive interference while others experience destructive interference. Beamforming can be used at both the transmitting and receiving ends in order to achieve spatial selectivity. In some cases (e.g., the IEEE 802.11ac standard), a beamforming steering matrix is used by a transmitter. The beamforming steering matrix may include a mathematical description of how the antenna array should use each of its individual antenna elements to select a spatial path for transmission. While certain aspects are described herein with respect to channel response information, beamforming state information or beamformer steering matrix state may also be used in the aspects described as well.

The channel information for each of the communication links may be analyzed (e.g., by a hub device or other device in the network, or a remote device communicably coupled to the network) to detect whether motion has occurred in the space, to determine a relative location of the detected motion, or both. In some aspects, the channel information for each of the communication links may be analyzed to detect whether an object is present or absent, e.g., when no motion is detected in the space.

In some implementations, the wireless communication network may include a wireless mesh network. A wireless mesh network may refer to a decentralized wireless network whose nodes (e.g. wireless communication devices) communicate directly in a point-to-point manner without using a central access point, base station or network controller. Wireless mesh networks may include mesh clients, mesh routers, or mesh gateways. In some instances, a wireless mesh network is based on the IEEE 802.11s standard. In some instances, a wireless mesh network is based on Wi-Fi ad hoc or another standardized technology.

FIG. 1 illustrates an example wireless communication system 100. The example wireless communication system 100 includes three wireless communication devices—a first wireless communication device 102A, a second wireless communication device 102B, and a third wireless communication device 102C. The example wireless communication system 100 may include additional wireless communication devices 102 and/or other components (e.g., one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); 5G standards, and others. In the example shown in FIG. 1, the wireless communication devices 102A, 102B, 102C can be, or may include, standard wireless network components. For example, the wireless communication devices 102A, 102B, 102C may be commercially-available Wi-Fi devices.

In some cases, the wireless communication devices 102A, 102B, 102C may be Wi-Fi access points or another type of wireless access point (WAP). The wireless communication devices 102A, 102B, 102C may be configured to perform one or more operations as described herein that are embedded as instructions (e.g., software or firmware) on the wireless communication devices. In some cases, the wireless communication devices 102A, 102B, 102C may be nodes of a wireless mesh network, such as, for example, a commercially-available mesh network system (e.g., GOOGLE Wi-Fi). In some cases, another type of standard or conventional Wi-Fi transceiver device may be used. The wireless communication devices 102A, 102B, 102C may be implemented without Wi-Fi components; for example, other types of wireless protocols for wireless communication, either standard or non-standard, may be used for motion detection.

In the example shown in FIG. 1, the wireless communication devices, e.g., 102A, 102B transmit wireless signals over a communication channel (e.g., according to a wireless network standard, a motion detection protocol, a presence detection protocol, or other standard or non-standard protocol). For example, the wireless communication devices may generate motion probe signals for transmission to probe a space to detect motion or presence of an object. In some implementations, the motion probe signals may include standard signaling or communication frames that include standard pilot signals used in channel sounding (e.g., channel sounding for beamforming according to the IEEE 802.11ac-2013 standard). In some cases, the motion probe signals include reference signals known to all devices in the network. In some instances, one or more of the wireless communication devices may process motion detection signals, which are signals received based on motion probe signals transmitted through the space. For example, the motion detection signals may be analyzed to detect motion of an object in a space, lack of motion in the space, or presence or absence of an object in the space when lack of motion is detected, based on changes (or lack thereof) detected in the communication channel.

The wireless communication devices transmitting motion probe signals, e.g. 102A, 102B, may be referred to as source devices. In some cases, wireless communication devices 102A, 102B may broadcast the wireless motion probe signals (e.g., described above). In other cases, the wireless communication devices 102A, 102B may send wireless signals addressed to other wireless communication device 102C and other devices (e.g., a user equipment, a client device, a server, etc.). The wireless communication device 102C as well as the other devices (not shown) may receive the wireless signals transmitted by the wireless communication devices 102A, 102B. In some cases, the wireless signals transmitted by the wireless communication devices 102A, 102B are repeated periodically, for example, according to a wireless communication standard or otherwise.

In some examples, the wireless communication device 102C, which may be referred to as a sensor device, processes the wireless signals received from the wireless communication devices 102A, 102B to detect motion, or lack of motion, of an object in a space accessed by the wireless signals. In some examples, another device or computing system processes the wireless signals received by the wireless communication device 102C from the wireless communication devices 102A, 102B to detect motion, or lack of motion, of an object in a space accessed by the wireless signals. In some cases, the wireless communication device 102C (or another system or device) processes the wireless signals to detect presence or absence of an object in a space when lack of motion is detected. In some instances, the wireless communication device 102C (or another system or device) may perform one or more operations as described below with respect to FIG. 4 or in the example process described with respect to FIG. 5, or another type of process for detecting motion, detecting lack of motion, or detecting presence or absence of an object when lack of motion is detected. In other examples, the wireless communication system 100 may be modified, for instance, such that the wireless communication device 102C can transmit wireless signals, e.g. as a source device, and the wireless communication devices 102A, 102B may process the wireless signals, e.g. as sensor devices, from the wireless communication device 102C, to detect motion, lack of motion, or presence when no motion is detected. That is, each of the wireless communication devices 102A, 102B, 102C, may be configured, in some cases, as a source device, a sensor device, or both.

The wireless signals used for motion and/or presence detection can include, for example, a beacon signal (e.g., Bluetooth Beacons, Wi-Fi Beacons, other wireless beacon signals), pilot signals (e.g., pilot signals used for channel sounding, such as in beamforming applications, according to the IEEE 802.11ac-2013 standard), or another standard signal generated for other purposes according to a wireless network standard, or non-standard signals (e.g., random signals, reference signals, etc.) generated for motion and/or presence detection or other purposes. In some cases, the wireless signals for motion and/or presence detection are known to all devices in the network.

In some examples, the wireless signals may propagate through an object (e.g., a wall) before or after interacting with a moving object, which may allow the moving object's movement to be detected without an optical line-of-sight between the moving object and the transmission or receiving hardware. In some cases, the wireless signals, when received by a wireless communication device, e.g. 102C, may indicate lack of motion in a space, for example, that an object is not moving, or no longer moving, in the space. In some cases, the wireless signals, when received by a wireless communication device, e.g. 102C, may indicate the presence of an object in the space when lack of motion is detected. Conversely, the wireless signals may indicate the absence of an object in the space when lack of motion is detected. For example, based on the received wireless signals, the third wireless communication device 102C may generate motion data, presence data, or both. In some instances, the third wireless communication device 102C may communicate the motion detection and/or presence data, to another device or system, such as a security system, that may include a control center for monitoring movement within a space, such as a room, building, outdoor area, etc.

In some implementations, the wireless communication devices 102A, 102B may be configured to transmit motion probe signals (e.g., as described above) on a separate wireless communication channel (e.g., a frequency channel or coded channel) from wireless network traffic signals. For example, the modulation applied to the payload of a motion probe signal and the type of data or data structure in the payload may be known by the third wireless communication device 102C, which may reduce the amount of processing that the third wireless communication device 102C performs for motion and presence detection. The header may include additional information such as, for example, an indication of whether motion or lack of motion was detected by another device in the communication system 100, whether a presence of an object was detected by another device in the communication system 100, an indication of the modulation type, an identification of the device transmitting the signal, etc.

In the example shown in FIG. 1, the wireless communication system 100 is illustrated as a wireless mesh network, with wireless communication links between each of the respective wireless communication devices 102. In the example shown, the wireless communication link between the third wireless communication device 102C and the first wireless communication device 102A can be used to probe a first motion detection zone 110A, the wireless communication link between the third wireless communication device 102C and the second wireless communication device 102B can be used to probe a second motion detection zone 110B, and the wireless communication link between the first wireless communication device 102A and the second wireless communication device 102B can be used to probe a third motion detection zone 110C. In some instances, each wireless communication device 102 may be configured to detect motion, lack of motion, and/or presence or absence of an object when no motion detected, in each of the motion detection zones 110 accessed by that device by processing received signals that are based on wireless signals transmitted by the wireless communication devices 102 through the motion detection zones 110. For example, when the person 106 shown in FIG. 1 moves in the first motion detection zone 110A and the third motion detection zone 110C, the wireless communication devices 102 may detect the motion based on signals they received that are based on wireless signals transmitted through the respective motion detection zones 110. For instance, the first wireless communication device 102A can detect motion of the person in both the first and third motion detection zones 110A, 110C, the second wireless communication device 102B can detect motion of the person 106 in the third motion detection zone 110C, and the third wireless communication device 102C can detect motion of the person 106 in the first motion detection zone 110A. In some cases, lack of motion by the person and, in other cases, presence of the person when the person is not detected to be moving, may be detected in each of the motion detection zones 110A, 110B, 110C.

In some instances, the motion detection zones 110 can include, for example, air, solid materials, liquids, or another medium through which wireless electromagnetic signals may propagate. In the example shown in FIG. 1, the first motion detection zone 110A provides a wireless communication channel between the first wireless communication device 102A and the third wireless communication device 102C, the second motion detection zone 110B provides a wireless communication channel between the second wireless communication device 102B and the third wireless communication device 102C, and the third motion detection zone 110C provides a wireless communication channel between the first wireless communication device 102A and the second wireless communication device 102B. In some aspects of operation, wireless signals transmitted on a wireless communication channel (separate from or shared with the wireless communication channel for network traffic) are used to detect movement or lack of movement of an object in a space, and may be used to detect presence (or absence) of an object in the space when there is a lack of movement detected. The objects can be any type of static or moveable object, and can be living or inanimate. For example, the object can be a human (e.g., the person 106 shown in FIG. 1), an animal, an inorganic object, or another device, apparatus, or assembly, an object that defines all or part of the boundary of a space (e.g., a wall, door, window, etc.), or another type of object. In some implementations, motion information from the wireless communication devices may trigger further analysis to determine presence or absence of an object when motion of the object is not detected.

In some implementations, the wireless communication system 100 may be, or may include, a monitoring system. The monitoring system may comprise one or more of the wireless communication devices 102A, 102B, 102C and possibly other components. One or more wireless communication devices 102A, 102B, 102C, in the monitoring system may be configured for motion detection, presence detection, or both (described below). The monitoring system may comprise a database that stores signals. The stored signals may include respective measurements or metrics (e.g., channel response information, beamforming state information or other channel information) for each received signal, and the stored signals may be associated with a channel state, e.g. motion, lack of motion, etc. One of the wireless communication devices 102A, 102B, 102C of the monitoring system may comprise a central hub or server for processing received signals and other information to detect motion and/or presence. A wireless communication device 102 configured for motion detection may perform a process to detect motion in a space and may make requests to a presence detector to perform further analysis on a space. A wireless communication device 102 configured for presence detection may perform a process to detect presence (or absence) of an object in a space when no motion is detected in the space. The storage of data, e.g. in the database, and/or the determination of motion, lack of motion (e.g. a steady state), or presence detection may be performed on a wireless communication device 102 configured as either a sensor device, a WAP device (e.g. gateway device), or in some cases, may be performed on the cloud.

FIGS. 2A, 2B, 2C, and 2D are diagrams showing example wireless signals communicated between wireless communication devices 204A, 204B, 204C. The wireless communication devices 204A, 204B, 204C may be, for example, the wireless communication devices 102A, 102B, 102C shown in FIG. 1, or may be other types of wireless communication devices. Examples of other types of wireless devices are a wireless mesh device, a stationary wireless client device, a mobile wireless client device, etc.

In some cases, a combination of one or more of the wireless communication devices 204A, 204B, 204C can form, or may be part of, a dedicated monitoring system. For example, as part of the dedicated monitoring system, one or more of the wireless communication devices 204A, 204B, 204C may be configured for motion detection, presence detection, or both, in the monitoring system. In some cases, a combination of one or more of the wireless communication devices 204A, 204B, 204C may be, or may be part of, an ad hoc monitoring system.

The example wireless communication devices 204A, 204B, 204C may transmit and/or receive wireless signals through a space 200. The example space 200 may be completely or partially enclosed or open at one or more boundaries of the space 200. The space 200 may be or may include an interior of a room, multiple rooms, a building, an indoor area, outdoor area, or the like. A first wall 202A, a second wall 202B, and a third wall 202C at least partially enclose the space 200 in the example shown.

In the example shown in FIGS. 2A and 2B, the first wireless communication device 204A is operable to transmit wireless motion probe signals repeatedly (e.g., periodically, intermittently, at scheduled, unscheduled or random intervals, etc.), e.g. as a source device. The second and third wireless communication devices 204B, 204C are operable to receive signals based on the motion probe signals transmitted by the wireless communication device 204A, e.g. as a sensor device. The motion probe signals may be formatted as described above. For example, in some implementations, the motion probe signals include standard signaling or communication frames that include standard pilot signals used in channel sounding (e.g., channel sounding for beamforming according to the IEEE 802.11ac-2013 standard). The wireless communication devices 204B, 204C each have an interface, modem, processor, or other component that is configured to process received motion detection signals to detect motion or lack of motion, of an object in the space 200. In some instances, the wireless communication devices 204B, 204C may each have an interface, modem, processor, or other component that is configured to detect the presence or absence of an object in the space 200 when lack of motion is detected, for example, whether the space is occupied or non-occupied.

As shown, an object is in a first position 214A at an initial time t=0 in FIG. 2A, and the object has moved to a second position 214B at subsequent time t=1 in FIG. 2B. In FIGS. 2A and 2B, the moving object in the space 200 is represented as a human, but the moving object can be another type of object. For example, the moving object can be an animal, an inorganic object (e.g., a system, device, apparatus, or assembly), an object that defines all or part of the boundary of the space 200 (e.g., a wall, door, window, etc.), or another type of object. For this example, the representation of the object's 214 movement is merely indicative that the object's location changed within the space 200 between time t=0 and time t=1. Further, the depiction of object 214 in FIGS. 2A-2D is not intended to represent a change in location caused by movement of the object 214 in any particular direction or path the object 214 may have taken in changing its location.

As shown in FIGS. 2A and 2B, multiple example paths of the wireless signals transmitted from the first wireless communication device 204A are illustrated by dashed lines. Along a first signal path 216, the wireless signal is transmitted from the first wireless communication device 204A and reflected off the first wall 202A toward the second wireless communication device 204B. Along a second signal path 218, the wireless signal is transmitted from the first wireless communication device 204A and reflected off the second wall 202B and the first wall 202A toward the third wireless communication device 204C. Along a third signal path 220, the wireless signal is transmitted from the first wireless communication device 204A and reflected off the second wall 202B toward the third wireless communication device 204C. Along a fourth signal path 222, the wireless signal is transmitted from the first wireless communication device 204A and reflected off the third wall 202C toward the second wireless communication device 204B.

In FIG. 2A, along a fifth signal path 224A, the wireless signal is transmitted from the first wireless communication device 204A and reflected off the object at the first position 214A toward the third wireless communication device 204C. Between time t=0 in FIG. 2A and time t=1 in FIG. 2B, a surface of the object moves from the first position 214A to a second position 214B in the space 200 (e.g., some distance away from the first position 214A). In FIG. 2B, along a sixth signal path 224B, the wireless signal is transmitted from the first wireless communication device 204A and reflected off the object at the second position 214B toward the third wireless communication device 204C. The sixth signal path 224B depicted in FIG. 2B is longer than the fifth signal path 224A depicted in FIG. 2A due to the movement of the object from the first position 214A to the second position 214B. In some examples, a signal path can be added, removed, or otherwise modified due to movement of an object in a space.

The example wireless signals shown in FIGS. 2A and 2B may experience attenuation, frequency shifts, phase shifts, or other effects through their respective paths and may have portions that propagate in another direction, for example, through the walls 202A, 202B, and 202C. In some examples, the wireless signals are radio frequency (RF) signals. The wireless signals may include other types of signals.

In the example shown in FIGS. 2A and 2B, the first wireless communication device 204A may be configured as a source device and may repeatedly transmit a wireless signal. For example, FIG. 2A shows the wireless signal being transmitted from the first wireless communication device 204A during a first time t=0. The transmitted signal may be transmitted continuously, periodically, at random or intermittent times or the like, or a combination thereof. For example, the transmitted signal may be transmitted one or more times between time t=0 and a subsequent time t=1 illustrated in FIG. 2B, or any other subsequent time. The transmitted signal may have a number of frequency components in a frequency bandwidth. The transmitted signal may be transmitted from the first wireless communication device 204A in an omnidirectional manner, in a directional manner or otherwise. In the example shown, the wireless signals traverse multiple respective paths in the space 200, and the signal along each path may become attenuated due to path losses, scattering, reflection, or the like and may have a phase or frequency offset.

As shown in FIGS. 2A and 2B, the signals from various paths 216, 218, 220, 222, 224A, and 224B combine at the third wireless communication device 204C and the second wireless communication device 204B to form received signals. Because of the effects of the multiple paths in the space 200 on the transmitted signal, the space 200 may be represented as a transfer function (e.g., a filter) in which the transmitted signal is input and the received signal is output. When an object moves in the space 200, the attenuation or phase offset affected upon a signal in a signal path can change, and hence, the transfer function of the space 200 can change. Assuming the same wireless signal is transmitted from the first wireless communication device 204A, if the transfer function of the space 200 changes, the output of that transfer function, e.g. the received signal, will also change. A change in the received signal can be used to detect movement of an object. Conversely, in some cases, if the transfer function of the space does not change, the output of the transfer function—the received signal—will not change. Lack of change in the received signal (e.g., a steady state) may indicate lack of movement in the space 200. In some cases, when the received signal indicates lack of movement, presence of an object may be detected by further analysis, for example, in the case when the object 214 is present in the space 200 but motion of the object is not detected.

Mathematically, a transmitted signal f(t) transmitted from the first wireless communication device 204A may be described according to Equation (1):

$$f(t) = \sum_{n=-\infty}^{\infty} c_n e^{j\omega_n t} \qquad (1)$$

where $\omega_n$ represents the frequency of nth frequency component of the transmitted signal, $c_n$ represents the complex coefficient of the nth frequency component, and t represents time. With the transmitted signal f(t) being transmitted from the first wireless communication device 204A, an output signal $r_k(t)$ from a path k may be described according to Equation (2):

$$r_k(t) = \sum_{n=-\infty}^{\infty} \alpha_{n,k} c_n e^{j(\omega_n t + \phi_{n,k})} \qquad (2)$$

where $\alpha_{n,k}$ represents an attenuation factor (or channel response; e.g., due to scattering, reflection, and path losses) for the nth frequency component along path k, and $\phi_{n,k}$ represents the phase of the signal for nth frequency component along path k. Then, the received signal R at a wireless communication device can be described as the summation of all output signals $r_k(t)$ from all paths to the wireless communication device, which is shown in Equation (3):

$$R = \sum_k r_k(t) \qquad (3)$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \qquad (4)$$

The received signal R at a wireless communication device can then be analyzed. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For a frequency component at frequency $\omega_n$, a complex value $Y_n$ may be represented as follows in Equation (5):

$$Y_n = \sum_k c_n \alpha_{n,k} e^{j\phi_{n,k}}. \qquad (5)$$

The complex value $Y_n$ for a given frequency component $\omega_n$ indicates a relative magnitude and phase offset of the received signal at that frequency component $\omega_n$. When an object moves in the space, the complex value $Y_n$ changes due to the channel response $\alpha_{n,k}$ of the space changing. Accordingly, a change detected in the channel response (and thus, the complex value $Y_n$) can be indicative of movement of an object within the communication channel. Conversely, a stable channel response (or "steady state"), for example, when no change or only small changes are detected in the channel response (or the complex value $Y_n$), indicates lack of movement. Thus, in some implementations, the complex value $Y_n$ for each of multiple devices in a wireless mesh network can be analyzed to detect whether motion has occurred, or whether there is lack of motion, in a space traversed by the transmitted signals f(t). In some cases, when lack of movement is detected, further analysis may be performed on the channel response to determine if an object is present in the space, but not moving.

In another aspect of FIGS. 2A and 2B, beamforming may be performed between devices based on some knowledge of the communication channel (e.g., through feedback properties generated by a receiver), which can be used to generate one or more steering properties (e.g., a steering matrix) that are applied by a transmitter device to shape the transmitted beam/signal in a particular direction or directions. Thus, changes to the steering or feedback properties used in the beamforming process indicate changes, which may be caused by moving objects, in the space accessed by the wireless communication system, as described herein. For example, motion may be detected by substantial changes in the communication channel, e.g. as indicated by a channel response, or steering or feedback properties, or any combination thereof, over a period of time.

In some implementations, for example, a steering matrix may be generated at a transmitter device (beamformer) based on a feedback matrix provided by a receiver device (beamformee) based on channel sounding. Because the steering and feedback matrices are related to propagation characteristics of the channel, these matrices change as objects move within the channel. Changes in the channel characteristics are accordingly reflected in these matrices, and by analyzing the matrices, motion can be detected, and different characteristics of the detected motion can be determined. In some implementations, a spatial map may be generated based on one or more beamforming matrices. The spatial map may indicate a general direction of an object in a space relative to a wireless communication device. In some cases, "modes" of a beamforming matrix (e.g., a feedback matrix or steering matrix) can be used to generate the spatial map. The spatial map may be used to detect the presence of motion in the space or to detect a location of the detected motion.

Figure 2C:
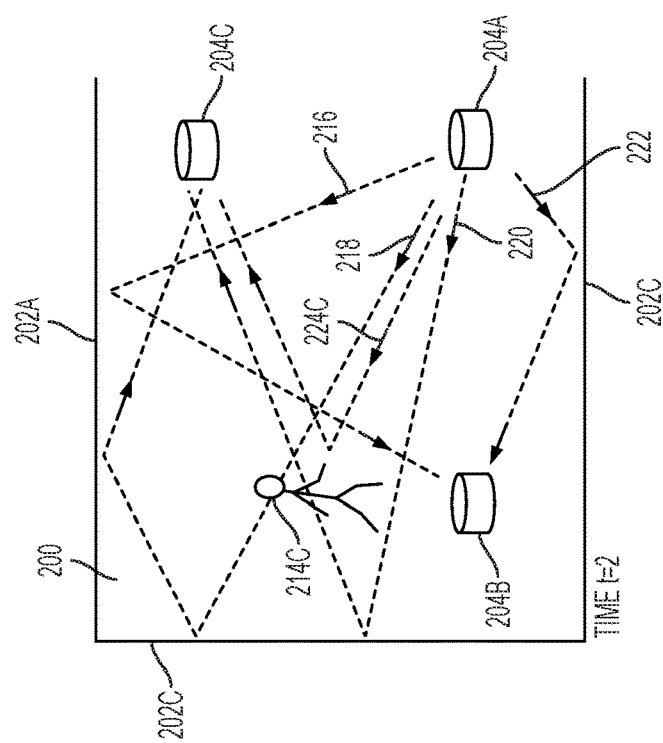

FIGS. 2C and 2D are diagrams showing the space 200 at subsequent times t=2 and t=3 . . . n, respectively (where n represents a further subsequent time). For example, in FIG. 2C, movement of an object 214C may be detected by a monitoring system based on the changes detected in channel information, e.g. channel responses, caused by object 214C. For example, analysis of the channel information for the wireless signal transmitted on signal path 224C from wireless device 204A at time t=2, may indicate that object 214C moved or is moving from the last time period, for example, time t=1 in FIG. 2B, or in some cases, time t=0 in FIG. 2A. In some cases, movement (or lack of movement) of the object 214C may be detected by a change (or lack of change) to other types of channel information, e. g. the state of a spatial beamformer. In FIG. 2D, the object 214D is present in the space at time t=3 and, in some cases, is still present subsequent to time t=3, but is not detected as moving. For example, the object 214 is in the same location at time t=3 as it was at time t=2, and the received signals at 204B and 204C are not changing over the same time period. In this example, analysis of the channel information based on the wireless signal transmitted on signal path 224D at subsequent time t=3 indicates a lack of movement of object 214D from previous time t=2. This lack of movement may be detected based on identifying a steady state of the channel information. In this example, the object 214D, while not moving in the space 200, is present in (or occupies) the space. In some instances, further analysis may be performed on the channel information to determine whether the object is present in (or occupies) the space.

A wireless communication system configured as, or including, a monitoring system may be configured to cover a particular zone within a space (e.g. a covered zone). In some cases, one or more wireless communication devices configured for motion detection (e.g. a motion detector) and presence detection (e.g. a presence detector) may be deployed in different zones within a space. A wireless communication device configured for motion detection and/or presence detection can include instructions (e.g. in software or firmware) for performing motion detection and/or presence detection processes according to the embodiments described herein. For example, a wireless communication device 102 configured for presence detection can receive wireless signals, e.g. calculate a channel response (or other channel information) based on a wireless signal transmitted through its covered zone, and associate certain channel states to the measurement. In an example, channel information or other metrics taken during presence detection may be associated with a channel state that indicates that no objects, moving or stationary, are present in the covered zone. The association between channel metrics and a corresponding channel state may be established in various ways. In one instance, the association may be established with user assistance and/or supervised machine learning. For example, a user may provide information via a mobile or web application interface (API) remotely to the presence detector that indicates the covered zone is unoccupied, which effectively labels the measurements in the covered zone and establishes the association between the measurements and a particular channel state, e.g. "unoccupied." In another instance, the association may be established with unsupervised machine learning. For example, presence detection may constantly monitor measurements associated with a steady state (e.g. a steady channel response or a steady spatial beamformer state) and make statistical assumptions about when its covered zone is occupied or not. For instance, when no changes to the channel information are detected over a significant period of time, e.g. some number of minutes or hours, during typical business hours, the presence detector may determine its covered zone is unoccupied. In some instances, the presence detector establishes associations based on a combination of any or all of the above approaches.

In some cases, changes to an unoccupied environment are possible over longer time intervals, e.g. hours, days, weeks, etc. For example, in a typical residential house, occupants may close or open doors or windows, move furniture or make other adjustments to a space that are significant enough to change the channel information in a covered zone. In one instance, the presence detector may re-measure the steady state over a defined time window and conclude there is a new metric (e.g., new steady state channel information) indicating that the covered zone is "unoccupied." In that case, the presence detector may establish a new association between the new metric and the channel state indicating "unoccupied". In some cases, the presence detector may maintain a database of all previously detected channel states and their associated metrics corresponding to an "unoccupied" state, and may add the new metric and its associated channel state to the database.

In some cases, the presence detector may receive a steady state indication and associated metric from the motion detector. In some cases, the presence detector establishes a reliable metric of the unoccupied space. In other cases, the presence detection process may use a previously recorded metric as the metric of the unoccupied space. In an example, the presence detector may compare its chosen metric indicating an unoccupied space against the new steady state metric received from the motion detector. In some cases, the presence detector may determine whether the object is still inside measured zone based on the comparison.

Figure 3B:
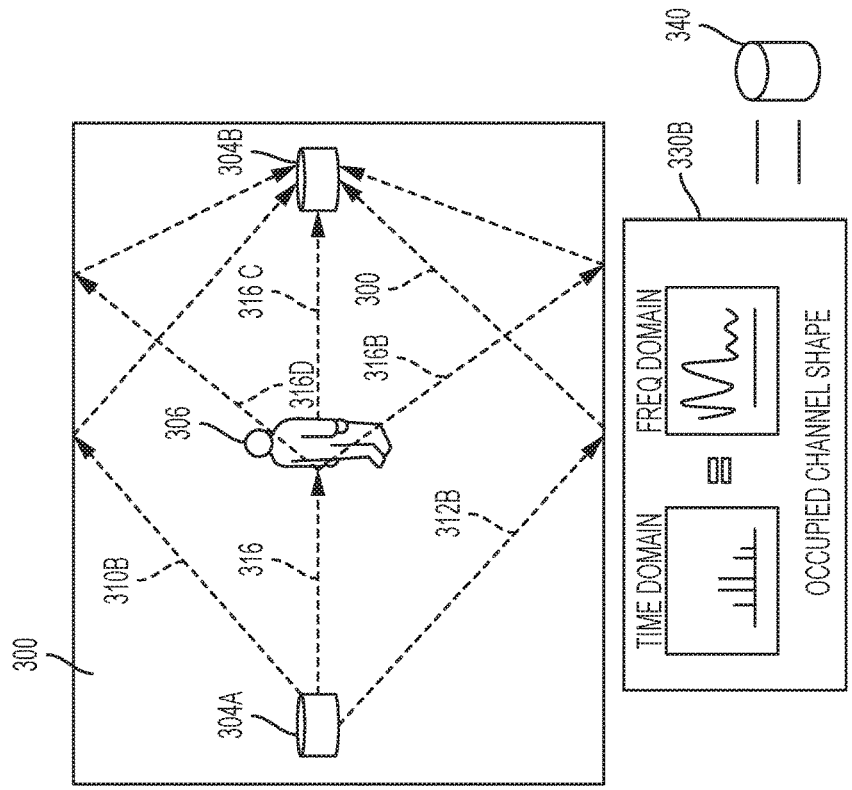
FIGS. 3A-3B are diagrams showing example wireless signals in an occupied and unoccupied space.
Figure 3A:
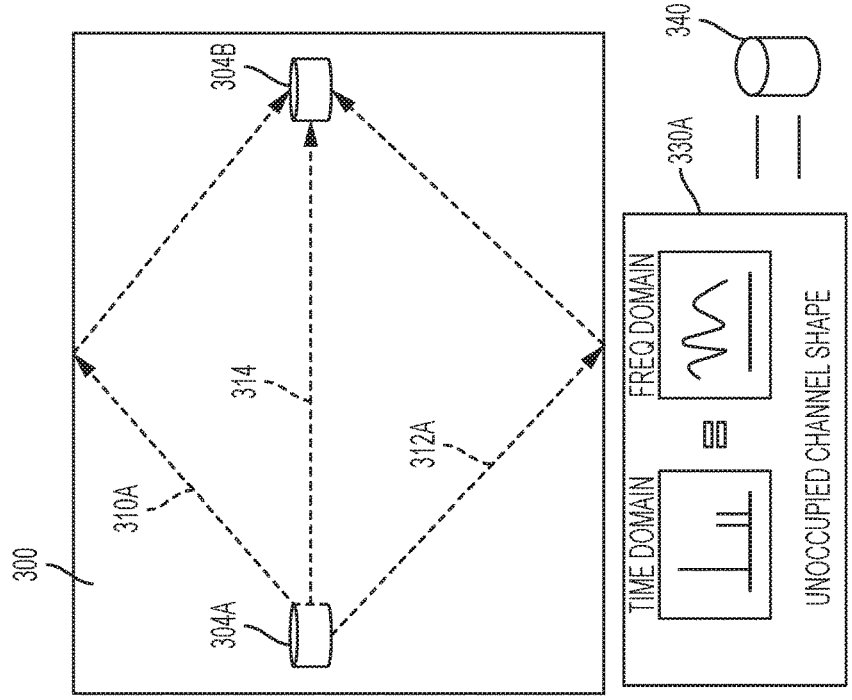

FIG. 3A and FIG. 3B illustrate examples of an unoccupied space and an occupied space where no movement is detected. In some cases, the space 300 may be determined to be unoccupied or occupied based on analysis of signals by a monitoring system. In some cases, one or more Wi-Fi presence detectors may measure received wireless signals and analyze associated channel information. Based on this analysis, the monitoring system may determine that no objects are present in the space, as illustrated in FIG. 3A, or that one or more objects are present in the space, as illustrated in FIG. 3B. In some instances, the space 300 shown in FIGS. 3A-3B may be, for example, the space 200 illustrated in FIGS. 2A-2D.

In the example illustrated in FIG. 3A, the space is shown as being an empty space. In this case, wireless communication device 304A transmits one or more wireless signals on signal paths 310A, 312A, and 314, through a space 300. In this case, the wireless signals received over paths 310A, 312A, and 314, when analyzed in the time domain and/or the frequency domain by wireless communication device 304B, may have channel shapes 330A indicating the space is unoccupied. During training or at other times, the channel information or other types of signals corresponding to the channel shapes 330A, and its associated "unoccupied" state may be stored in database 340. For example, database 340 may store data as data vectors. In some cases, database 340 may be implemented with various complexities. For example, database 340, in some cases, may be implemented as a simple programmable lookup table on a sensor device, e.g. wireless communication device 304B, or in other cases, database 340 may be a more complex database arrangement, and in some instances, may include, e.g. a full database engine.

For example, in a typical sequence of human motion, a human subject, e.g. object 306, may enter a covered zone, e.g. space 300, causing constant changes to the channel information while moving through the covered zone. At some point in time, the subject may stop while in the covered zone, leading to stabilization of the channel information (e.g. the channel information is in a steady state). In this example, the motion detector may conclude that motion is no longer occurring inside the covered zone, e.g. lack of motion. In some instances, the motion detector may provide a new steady state and its associated metrics related to the lack of motion, to the presence detector for further investigation of the subject within the covered zone.

In the example illustrated in FIG. 3B, the monitoring system may determine that the space 300 is occupied. For example, object 306, depicted as the human subject, is present in the space but not moving, e.g. the object is stationary. In some cases, the human subject may make movements that are not significant enough to be detected by the motion detector. For example, the changes in the channel information due to slight movements made by object 306 may not be sufficient for the motion detector to detect movement of the subject, and further, the motion detector may not be able to detect whether the object 306 is still present in the space. In some cases, presence of the object 306 in the covered zone 300 may cause other subtle changes to the environment by respiratory activity, such as, breathing, or small body movements, such as, light swinging. In some cases, the presence detector may analyze these types of changes to the channel information, which otherwise may not trigger detection of movement of the measured object, in order to determine the presence of object 306 in the space when motion of the object is not detected. In some cases, these changes to the channel information may be detected by the presence detector. In some cases, channel changes may be detected within defined margins. In some cases, the presence detector may detect channel changes within the defined margins and determine the presence of an object in the measured space when the channel changes do not otherwise indicate motion.

In FIG. 3B, wireless communication device 304A transmits one or more wireless signals through the space 300 on signal paths 310B, 312B, and 316. In this case, the wireless signals received over paths 310B, 312B, and 316, when analyzed in the time domain and/or the frequency domain by wireless communication device 304B, may have channel shapes 330B indicating the space is occupied, which differ from the channel shapes 330A of the unoccupied space. In some cases, the channel information or other types of signals corresponding to the channel shapes 330B, and its associated "occupied" state may be stored in database 340 during training of the monitoring system.

In some cases, when changes to the channel information are detected within the defined margins indicating presence of the subject, but no motion by the subject, the presence detector may mark, or flag, the channel information accordingly. For example, the channel information may be marked as indicating "no motion but positive presence detection". In some cases, recurring, or cyclic, deviations from the steady state increase the confidence that the measured object is inside the measured zone.

In some cases, the presence detector may report its findings to the monitoring system, e.g. the motion detector, and, in some instances, to a user application interface of a user device. In some cases, it is reported that the measured object is not moving but still present inside the measured zone. In some cases, the motion detection system may store the findings of the presence detection analysis. In some instances, the findings may be used for further higher-level analytics gathering.

Figure 4:
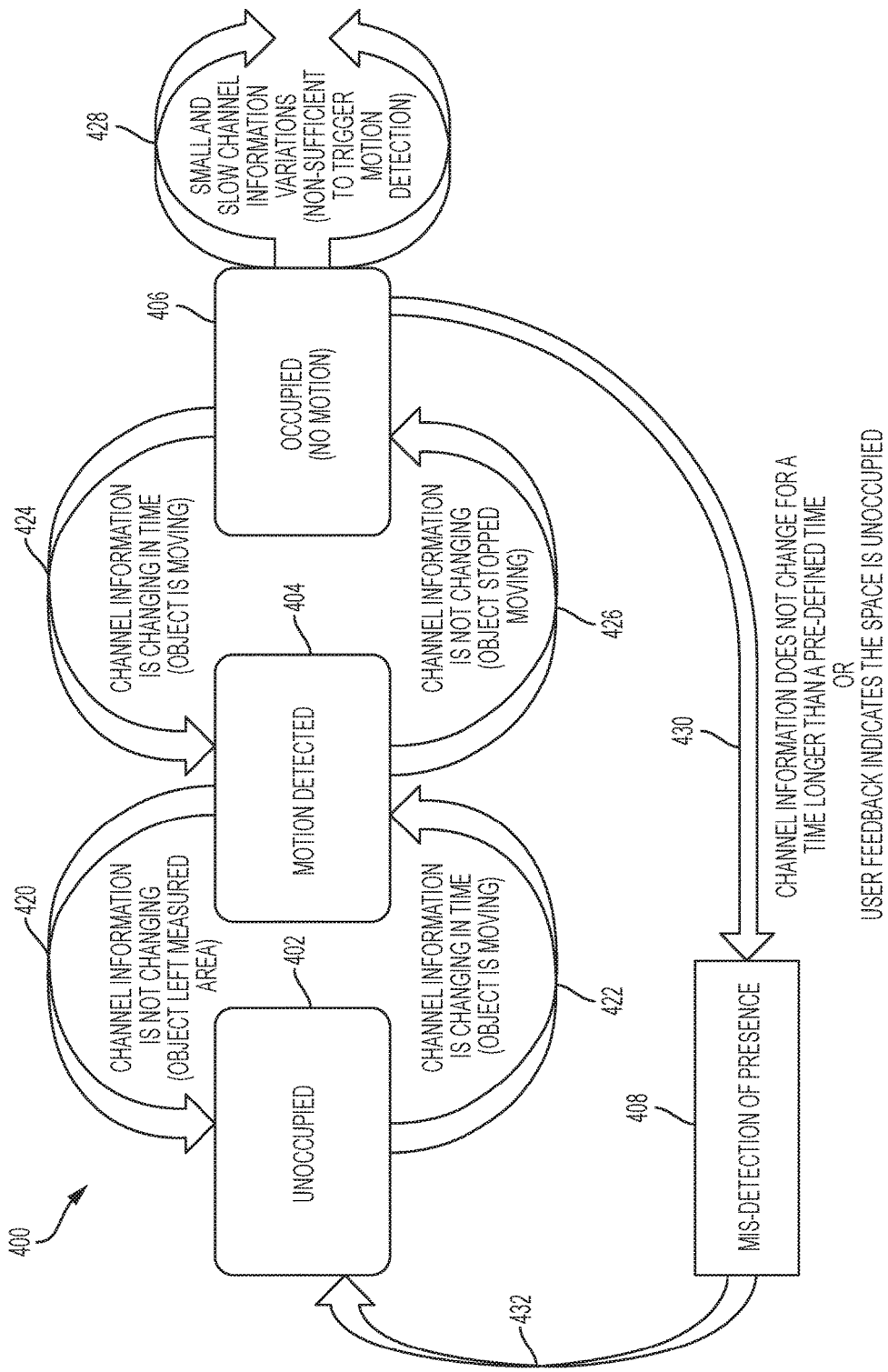
FIG. 4 is a block diagram showing examples of channel states based on wireless signals communicated between wireless communication devices.

FIG. 4 is a block diagram 400 showing examples of channel states based on wireless signals communicated between wireless communication devices, e.g. as described above with respect to FIGS. 2A-2D. The channel states may be used or determined by a monitoring system configured for motion detection and/or presence detection, e.g. one or more wireless communication devices 102 configured as a motion detector and/or a presence detector, to indicate the status of a measured space with respect to motion or occupancy of the space. In some cases, channel information may be determined to be in a steady state, for example, indicating an "Unoccupied" 402 state or an "Occupied (no motion)" 406 state, as described above with respect to FIGS. 3A-3B. In some cases, channel information may be determined to be changing over time. The changes in the channel information may be caused by movement, for example, indicating a "Motion Detected" 404 state. While in a particular channel state, one or more events affecting the channel information may cause the channel state to transition to another channel state.

In one example, channel information indicates that the space is unoccupied, e.g. in an "Unoccupied" 402 state. Such channel information may be considered a steady state because the channel information (e.g., channel responses, or the state of a spatial beamformer) is not changing enough to indicate motion, or in some instances, to indicate presence. The monitoring system may have determined that the space is unoccupied because the channel information (e.g., the channel shape in the time or frequency domain) corresponds to, for example, channel information which has been marked as indicating an unoccupied space, as illustrated in FIG. 3A. The channel information may remain in this steady state until the channel information changes in time 422, which may indicate that an object is moving in the space. When movement is detected while in the "Unoccupied" 402 state, the channel state may change to the "Motion Detected" 404 state. While in the "Motion Detected" 404 state, the channel information may stop changing 420, and the monitoring system may detect that the object left the space. In this case, the channel state may be changed back to the "Unoccupied" 402 state. In other cases, however, the monitoring system may determine that the object stopped moving 426, or in some cases, the object is not making movements detected by the motion detector. In that case, the channel state may be changed from the "Motion Detected" 404 state to the "Occupied (no motion)" 406 state. If the monitoring system detects that the channel information is changing in time 424 and that the object is moving, the channel state will be changed to the "Motion Detected" 404 state.

In some cases, while the channel state is in the "Occupied (no motion)" 406 state, further analysis may be performed to determine if an object is still present in the space even though no motion is detected. For example, the presence detector of the monitoring system may analyze the channel information over time to detect any changes in the channel information that indicate presence of an object. In some instances, these changes are not sufficient to trigger motion detection. For example, the changes detected by the presence detection aspect may not be sufficient to change the channel state of the space to "Motion detected" 404. In one case, the changes detected may be within defined margins that denote presence, but not motion. The margins may be pre-defined by the monitoring system. In one case, the changes that may be detected by the presence detection aspect may be caused by subtle changes to the environment, for example, by respiratory activity, such as, breathing, or small body movements, such as, light swinging of an arm or leg, etc. The monitoring system may detect these types of channel variations, which are smaller than the channel variations indicating motion and occur more slowly in time than the channel variations indication motion, and therefore, are not sufficient to trigger motion detection. In some instances, the monitoring system may take the insignificant changes to the channel information into account to determine presence, particularly when the channel information changes within defined margins and the channel state is still classified as the "Occupied(no motion)" 406 state. In some cases, as long as these types of variations to the channel information are detected by the presence detection aspect of the monitoring system, the channel state will indicate the "Occupied (no motion)" 406 state. Further, measuring and detecting such small cyclic deviations from a known steady state increases the confidence that the object is present in the space. In some cases, a channel shape (or other channel information) newly identified as corresponding to "Occupied (no motion)" 406 is added to the database of "occupied" channel shapes, e.g. as illustrated in FIG. 3B. In an example, if the channel variations denoting presence are not detected by the monitoring system for a certain pre-defined amount of time, the monitoring system may determine that the space is not occupied 430. In another case, the monitoring system may determine that the space is unoccupied based on user feedback indicating the measured is not occupied 430. In either of these cases, the monitoring system may determine that a mis-detection of presence in the space occurred 408, and that the space is not occupied. In that instance, the channel state may be changed to the "Unoccupied" 402 state.

The monitoring system may report its findings regarding presence, or occupancy, of a space to another system or process, which may be in the cloud, for storage or for further higher-level analytics gathering. The findings may also be reported to a user application interface of a user device. In some cases, the findings may indicate that an object is not moving but still present inside the space, e.g. a covered zone.

Figure 5:
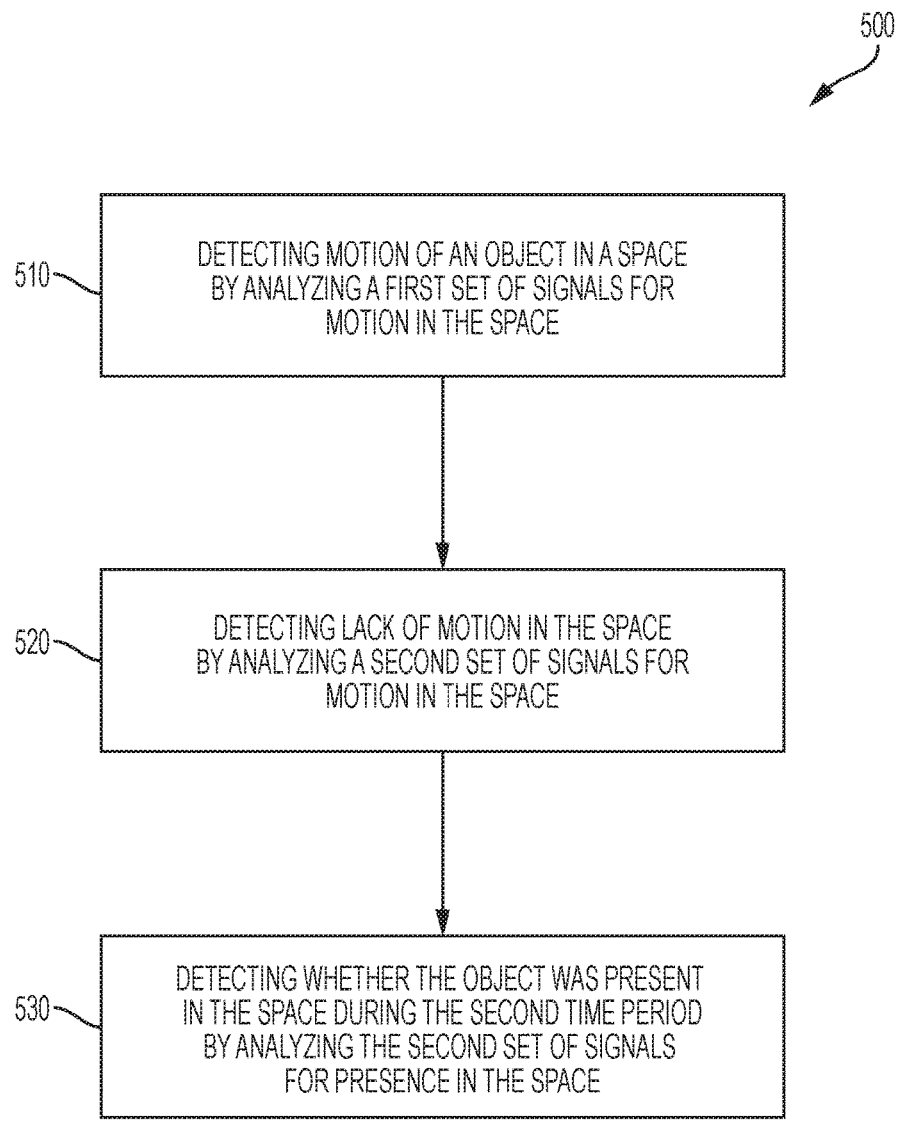
FIG. 5 is a flow diagram showing an example process for detecting presence of an object in a space based on wireless signals.

FIG. 5 is a flow chart showing an example process 500 for detecting presence of an object in a space based on channel information. This example process 500 can be performed in a monitoring system, e.g. the wireless communication system 100 or in another type of wireless system configured for motion detection and/or presence detection. In some implementations, the process shown in FIG. 5 can be performed by the devices 102A, 102B, 102C shown in FIG. 1 or other types of devices or components. The example process 500 may include additional or different operations, and the operations may be performed in the order shown or in another order. In some cases, one or more of the operations shown in FIG. 5 are implemented as processes that include multiple operations, sub-processes for other types of routines. In some cases, operations can be combined, performed in another order, performed in parallel, iterated or otherwise repeated or performed in another manner.

At 510, motion of an object in a space is detected by analyzing a first set of signals for motion in the space. In some cases, the first set of signals are based on wireless signals transmitted through the space by the wireless communication device in a first time period, as shown in, e.g. FIG. 2A and FIG. 2B. At 520, lack of motion in the space is detected by analyzing a second set of signals for motion in the space. In some cases, the second set of signals is based on wireless signals transmitted through the space by the wireless communication device in a second, subsequent time period, as shown in, e.g. FIG. 2C and FIG. 2D.

At 530, whether an object was present in the space during the second time period is detected by analyzing the second set of signals for presence in the space. In some cases, analyzing the second set of signals for presence comprises accessing a database of stored signals. In one instance, the second set of signals may be compared with the stored signals. In some instances, the database associates each of the stored signals with an occupied state of the space or an unoccupied state of the space. The stored signals can be, or they can be based on, for example, a channel shape (e.g., the example channel shapes 330A, 330B shown in FIG. 3A, 3B) or other types of measurements or metrics of a channel.

In some cases, the process 500 may detect that the object was present in the space during the second time period. For example, in one case, the object is determined to be present when the second set of signals match a first subset of stored signals associated with an unoccupied state of the space. In another case, the process 500 may detect that the object was not present in the space during the second time period. For example, the object may be determined not to be present when the second set of signals does not match any of a first subset of stored signals associated with an unoccupied state of the space. In another case, when detecting the object is present, the second set of signals may match a second subset of stored signals associated with an occupied state of the space.

In some cases, the second set of signals are analyzed for variations over time. In some instances, the variations have a characteristic associated with presence in the space. For example, the characteristic may be a change in the channel, which may be depicted as a channel shape in the time domain or the frequency domain as exemplified in FIGS. 2A and 2B, or the characteristic may be a user label indicating a space is occupied or unoccupied. In some cases, the process 500 may determine the space was unoccupied during the second time period based on lack of motion lasting longer than a threshold time duration. In some instances, the database may be updated to include a new stored signal, based on the second set of signals, associated with an unoccupied state of the space. In some cases, the signals that are stored may be obtained during a supervised motion detection training period for the space. In other cases, the signals are obtained during an unsupervised training period for the space.

Figure 6:
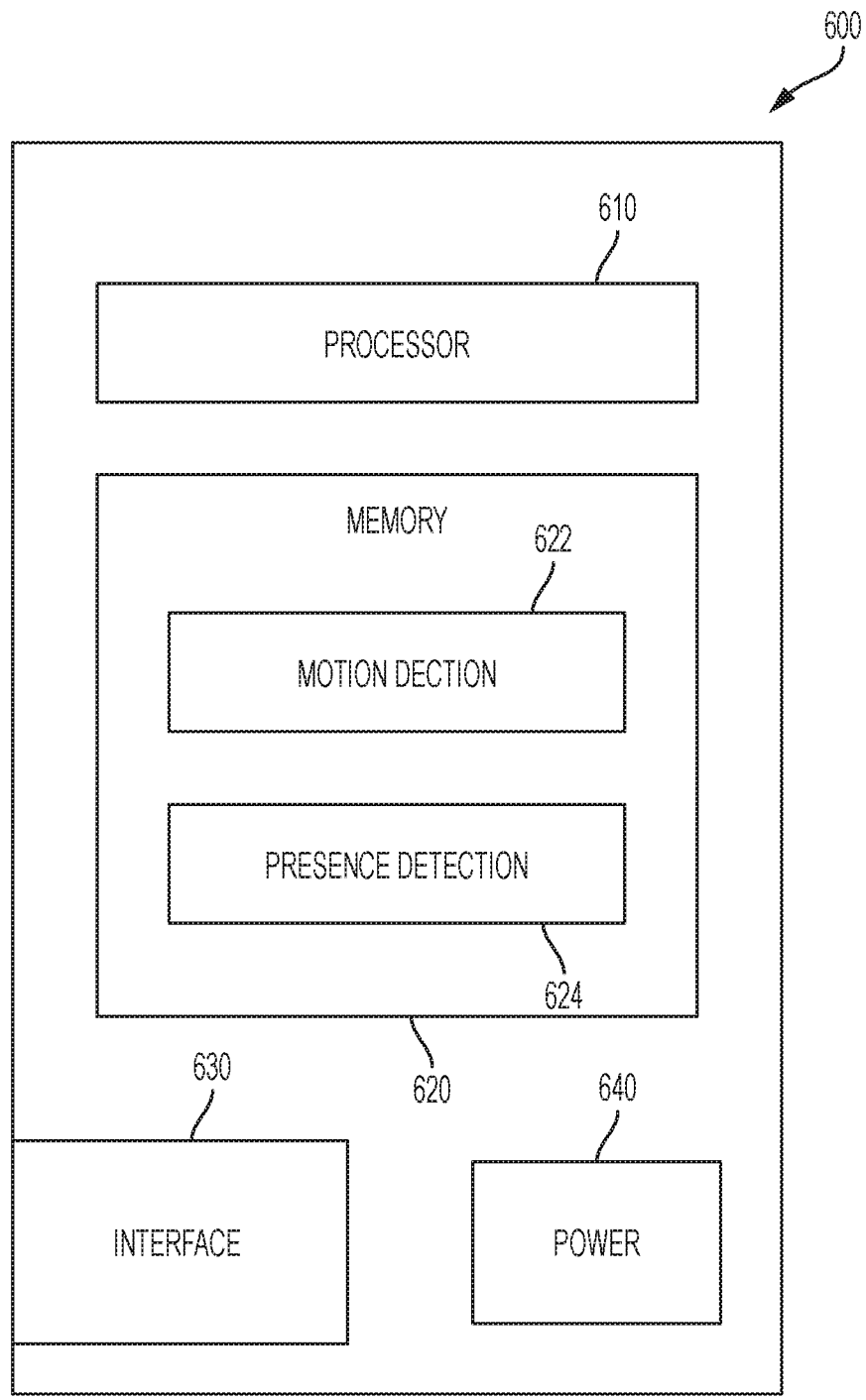
FIG. 6 is a block diagram showing an example wireless communication device.

FIG. 6 is a block diagram showing an example wireless communication device 600. As shown in FIG. 6, the example wireless communication device 600 includes a transmission and reception interface 630, a processor 610, a memory 620, and a power unit 640. For example, any of the wireless communication devices 102A, 102B, 102C in the wireless communication system 100 illustrated in FIG. 1 may include the same, additional or different components, and the components may be configured to operate as shown in FIG. 1 or in another manner. In some implementations, the interface 630, processor 610, memory 620, and power unit 640 of a wireless communication device are housed together in a common housing or other assembly. In some implementations, one or more of the components of a wireless communication device can be housed separately, for example, in a separate housing or other assembly.

The example interface 630 can communicate (receive, transmit, or both) wireless signals. For example, the interface 630 may be configured to communicate radio frequency (RF) signals formatted according to a wireless communication standard (e.g., Wi-Fi or Bluetooth). The interface 630 may be implemented as the example wireless interface 630 shown, or may be implemented in another manner, for example, with other types of components or subsystems. In some cases, the example interface 630 may be implemented as a modem. In some implementations, the example interface 630 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections.

In some cases, a radio subsystem in the interface 630 can include one or more antennas and radio frequency circuitry. The radio frequency circuitry can include, for example, circuitry that filters, amplifies or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include a radio chip, an RF front end, and one or more antennas. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc. In some implementations, the antenna includes multiple antennas.

In some cases, a baseband subsystem in the interface 630 can include, for example, digital electronics configured to process digital baseband data. As an example, the baseband subsystem may include a baseband chip. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in the example interface 630 receives baseband signals from the baseband subsystem, up-converts the baseband signals to radio frequency (RF) signals, and wirelessly transmits the radio frequency signals (e.g., through an antenna). In some instances, the radio subsystem in the example interface 630 wirelessly receives radio frequency signals (e.g., through an antenna), down-converts the radio frequency signals to baseband signals, and sends the baseband signals to the baseband subsystem. The signals exchanged between the radio subsystem and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the baseband subsystem of the example interface 630 can communicate wireless network traffic (e.g., data packets) in the wireless communication network through the radio subsystem on one or more network traffic channels. The baseband subsystem of the modem 112 may also transmit or receive (or both) signals (e.g., motion probe signals) through the radio subsystem on a dedicated wireless communication channel. In some instances, the baseband subsystem generates motion probe signals for transmission, for example, to probe a space to detect motion or lack of motion. In some implementations, the motion probe signals include standard signaling or communication frames that include standard pilot signals used in channel sounding (e.g., channel sounding for beamforming according to the IEEE 802.11ac-2013 standard). In some cases, the motion probe signals include reference signals known to all devices in the network. In some instances, the baseband subsystem may process received signals, for example, to detect motion of an object in a space, lack of motion in the space, or presence or absence of an object in the space when lack of motion is detected. For example, the baseband subsystem may analyze aspects of standard signaling protocols (e.g., channel sounding for beamforming according to the IEEE 802.11ac-2013 standard, such as, based on the steering or other matrix generated) to detect changes in the channel as a result of motion in the space.

The example processor 610 can execute instructions, for example, to generate output data based on data inputs. The instructions can include programs, codes, scripts, modules, or other types of data stored in memory 620, e.g. database 340. Additionally or alternatively, the instructions can be encoded as pre-programmed or re-programmable logic circuits, logic gates, or other types of hardware or firmware components or modules. The processor 610 may be or include a general-purpose microprocessor, as a specialized co-processor or another type of data processing apparatus. In some cases, the processor 610 performs high level operation of the wireless communication device 600. For example, the processor 610 may be configured to execute or interpret software, scripts, programs, functions, executables, or other instructions stored in the memory 620. In some implementations, the processor 610 be included in the interface 630.

The example memory 620 may include computer-readable storage media, for example, a volatile memory device, a non-volatile memory device, or both. The memory 620 may include one or more read-only memory devices, random-access memory devices, buffer memory devices, or a combination of these and other types of memory devices. In some instances, one or more components of the memory can be integrated or otherwise associated with another component of the wireless communication device 600. The memory 620 may store instructions that are executable by the processor 610. For example, the instructions may include instructions for analyzing channel information to detect motion of an object in a space, detect lack of motion in space, and detect presence or absence of an object when no motion is detected, such as through one or more of the operations as described in FIG. 4 or in the example process 500 shown in FIG. 5. In some instances, the memory 620 may include motion detection instructions 622 for detection motion and lack of motion and presence detection instructions 624 for detection of presence or absence of an object when no motion is detected.

The example power unit 640 provides power to the other components of the wireless communication device 600. For example, the other components may operate based on electrical power provided by the power unit 640 through a voltage bus or other connection. In some implementations, the power unit 640 includes a battery or a battery system, for example, a rechargeable battery. In some implementations, the power unit 640 includes an adapter (e.g., an AC adapter) that receives an external power signal (from an external source) and coverts the external power signal to an internal power signal conditioned for a component of the wireless communication device 600. The power unit 620 may include other components or operate in another manner.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, e.g. database 340, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the examples described here, a monitoring system detects presence of an object in a space, e.g., when no motion is detected.

In a first example, a monitoring system detects motion of an object in a space by analyzing a first set of signals for motion in the space. The first set of signals is based on wireless signals transmitted through the space by a wireless communication device in a first time period. Lack of motion is detected in the space by analyzing a second set of signals for motion in the space. The second set of signals is based on wireless signals transmitted through the space by the wireless communication device in a second, subsequent time period. Whether the object was present in the space during the second time period is detected by analyzing the second set of signals for presence in the space.

Implementations of the first, second, and third examples may include one or more of the following features. A database of stored signals may be accessed. The database associates each of the stored signals with an occupied state of the space or an unoccupied state of the space. The second set of signals is compared with the stored signals. That the object was not present in the space during the second time period is detected by analyzing the second set of signals for presence in the space and determining that the second set of signals matches one of a first subset of the stored signals; each of the first subset of the stored signals is associated with an unoccupied state of the space. That the object was present in the space during the second time period is detected by analyzing the second set of signals for presence in the space and determining that the second set of signals does not match any of a first subset of the stored signals; each of the first subset of the stored signals is associated with an unoccupied state of the space. The second set of signals can be analyzed for presence in the space by determining that the second set of signals matches one of a second subset of the stored signals; each signal of the second subset of the stored signals is associated with an occupied state of the space. The second set of signals may be analyzed for presence in the space by analyzing the second set of signals for variations over time; the variations having a characteristic associated with presence in the space. It may be determined that the space was unoccupied during the second time period based on feedback from a user device, and the database may be updated to include a new stored signal based on the second set of signals, where the new stored signal is associated with an unoccupied state of the space. It can be determined that the space was unoccupied during the second time period based on the lack of motion lasting longer than a threshold time duration, and the database may be updated to include a new stored signal based on the second set of signals, where the new stored signal is associated with an unoccupied state of the space. The stored signals may be obtained during a supervised motion detection training period for the space or during an unsupervised training period for the space.

In a second example, a computer-readable storage medium stores instructions that are operable when executed by a data processing apparatus to perform one or more operations of the first example.

In a third example, a monitoring system includes one or more processors and a memory storing instructions that are operable when executed by the one or more processors to perform one or more operations of the first example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

The invention claimed is:

1. A presence detection method comprising:
    detecting motion of an object in a space by analyzing a first set of signals for motion in the space, the first set of signals based on wireless signals transmitted through the space on a wireless communication link in a wireless communication network according to a wireless communication protocol between a first wireless communication device and a second wireless communication device in a first time period;
    detecting lack of motion in the space by analyzing a second set of signals for motion in the space, the second set of signals based on wireless signals transmitted through the space on the wireless communication link in the wireless communication network according to the wireless communication protocol between the first wireless communication device and the second wireless communication device in a second, subsequent time period; and
    detecting whether the object was present in the space during the second time period by analyzing the second set of signals for presence in the space.

2. The method of claim 1, wherein analyzing the second set of signals for presence in the space comprises:
    accessing a database of stored signals, wherein the database associates each of the stored signals with an occupied state of the space or an unoccupied state of the space; and
    comparing the second set of signals with the stored signals.

3. The method of claim 2, comprising detecting that the object was not present in the space during the second time period, wherein analyzing the second set of signals for presence in the space comprises determining that the second set of signals matches one of a first subset of the stored signals, each of the first subset of the stored signals being associated with an unoccupied state of the space.

4. The method of claim 2, comprising detecting that the object was present in the space during the second time period, wherein analyzing the second set of signals for presence in the space comprises determining that the second set of signals does not match any of a first subset of the stored signals, each of the first subset of the stored signals being associated with an unoccupied state of the space.

5. The method of claim 4, wherein analyzing the second set of signals for presence in the space further comprises determining that the second set of signals matches one of a second subset of the stored signals, each of the second subset of the stored signals being associated with an occupied state of the space.

6. The method of claim 4, wherein analyzing the second set of signals for presence in the space further comprises analyzing the second set of signals for variations over time, wherein the variations have a characteristic associated with presence in the space.

7. The method of claim 2, comprising:
determining that the space was unoccupied during the second time period based on feedback from a user device; and
updating the database to include a new stored signal based on the second set of signals, wherein the database associates the new stored signal with an unoccupied state of the space.

8. The method of claim 2, comprising:
determining that the space was unoccupied during the second time period based on the lack of motion lasting longer than a threshold time duration; and
updating the database to include a new stored signal based on the second set of signals, wherein the database associates the new stored signal with an unoccupied state of the space.

9. The method of claim 2, wherein the stored signals include one or more of:
stored signals obtained during a supervised motion detection training period for the space; or
stored signals obtained during an unsupervised training period for the space.

10. The method of claim 1, wherein the first set of wireless signals and the second set of wireless signals are addressed to the second wireless communication device from the first wireless communication device according to the wireless communication protocol.

11. A computer-readable storage medium storing instructions that are operable when executed by a data processing apparatus to perform operations comprising:
detecting motion of an object in a space by analyzing a first set of signals for motion in the space, the first set of signals based on wireless signals transmitted through the space on a wireless communication link in a wireless communication network according to a wireless communication protocol between a first wireless communication device and a second wireless communication device in a first time period;
detecting lack of motion in the space by analyzing a second set of signals for motion in the space, the second set of signals based on wireless signals transmitted through the space on the wireless communication link in the wireless communication network according to the wireless communication protocol between the first wireless communication device and the second wireless communication device in a second, subsequent time period; and detecting whether the object was present in the space during the second time period by analyzing the second set of signals for presence in the space.

12. The computer-readable storage medium of claim 11, wherein analyzing the second set of signals for presence in the space comprises:
accessing a database of stored signals, wherein the database associates each of the stored signals with an occupied state of the space or an unoccupied state of the space; and
comparing the second set of signals with the stored signals.

13. The computer-readable storage medium of claim 12, the operations comprising detecting that the object was not present in the space during the second time period, wherein analyzing the second set of signals for presence in the space comprises determining that the second set of signals matches one of a first subset of the stored signals, each of the first subset of the stored signals being associated with an unoccupied state of the space.

14. The computer-readable storage medium of claim 12, the operations comprising detecting that the object was present in the space during the second time period, wherein analyzing the second set of signals for presence in the space comprises determining that the second set of signals does not match any of a first subset of the stored signals, each of the first subset of the stored signals being associated with an unoccupied state of the space.

15. The computer-readable storage medium of claim 14, wherein analyzing the second set of signals for presence in the space further comprises determining that the second set of signals matches one of a second subset of the stored signals, each of the second subset of the stored signals being associated with an occupied state of the space.

16. The computer-readable storage medium of claim 14, wherein analyzing the second set of signals for presence in the space further comprises analyzing the second set of signals for variations over time, wherein the variations have a characteristic associated with presence in the space.

17. The computer-readable storage medium of claim 12, the operations comprising:
determining that the space was unoccupied during the second time period based on feedback from a user device; and
updating the database to include a new stored signal based on the second set of signals, wherein the database associates the new stored signal with an unoccupied state of the space.

18. The computer-readable storage medium of claim 12, the operations comprising:
determining that the space was unoccupied during the second time period based on the lack of motion lasting longer than a threshold time duration; and
updating the database to include a new stored signal based on the second set of signals, wherein the database associates the new stored signal with an unoccupied state of the space.

19. The computer-readable storage medium of claim 12, wherein
the stored signals include one or more of:
stored signals obtained during a supervised motion detection training period for the space; or
stored signals obtained during an unsupervised training period for the space.

20. A monitoring system comprising:
communication devices configured to transmit wireless signals through a space on wireless communication links in a wireless communication network according to a wireless communication protocol, the wireless communication devices comprising a first wireless communication device and a second wireless communication device;

one or more processors;

memory storing instructions, which when executed by the one or more processors, causes the monitoring system to:

detect motion of an object in the space by analyzing a first set of signals for motion in the space, the first set of signals based on wireless signals transmitted through the space on a wireless communication link in the wireless communication network according to the wireless communication protocol between the first wireless communication device and the second wireless communication device in a first time period;

detect lack of motion in the space by analyzing a second set of signals for motion in the space, the second set of signals based on wireless signals transmitted through the space on the wireless communication link in the wireless communication network according to the wireless communication protocol between the first wireless communication device and the second wireless communication device in a second, subsequent time period; and detect whether the object was present in the space during the second time period by analyzing the second set of signals for presence in the space.

21. The monitoring system of claim 20, further comprising a database comprising stored signals, wherein the database associates each of the stored signals with an occupied state of the space or an unoccupied state of the space, and analyzing the second set of signals for presence in the space comprises comparing the second set of signals with the stored signals.

22. The monitoring system of claim 21, wherein the instructions, when executed by the one or more processors, cause the monitoring system to detect that the object was not present in the space during the second time period if the second set of signals matches one of a first subset of the stored signals, each of the first subset of the stored signals being associated with an unoccupied state of the space.

23. The monitoring system of claim 21, wherein the instructions, when executed by the one or more processors, cause the monitoring system to detect that the object was present in the space during the second time period if the second set of signals does not match any of a first subset of the stored signals, each of the first subset of the stored signals being associated with an unoccupied state of the space.

24. The monitoring system of claim 23, wherein the instructions, when executed by the one or more processors, cause the monitoring system to detect that the object was present in the space during the second time period if the second set of signals matches any of a second subset of the stored signals, each of the second subset of the stored signals being associated with an occupied state of the space.

25. The monitoring system of claim 21, wherein the instructions, when executed by the one or more processors, cause the monitoring system to detect that the object was present in the space during the second time period if analysis of the second set of signals indicates variations that have a characteristic associated with presence in the space.

26. The monitoring system of claim 21, wherein the instructions, when executed by the one or more processors, cause the monitoring system to further:

determine that the space was unoccupied during the second time period based on feedback from a user device; and update the database to include a new stored signal based on the second set of signals, wherein the database associates the new stored signal with an unoccupied state of the space.

27. The monitoring system of claim 21, wherein the instructions, when executed by the one or more processors, cause the monitoring system to further:

determine that the space was unoccupied during the second time period based on the lack of motion lasting longer than a threshold time duration; and update the database to include a new stored signal based on the second set of signals, wherein the database associates the new stored signal with an unoccupied state of the space.

28. The monitoring system of claim 21, wherein the stored signals include one or more of:

stored signals obtained during a supervised motion detection training period for the space; or stored signals obtained during an unsupervised training period for the space.

\* \* \* \* \*

UNITED STATES PATENT AND TRADEMARK OFFICE
CERTIFICATE OF CORRECTION

PATENT NO. : 10,393,866 B1
APPLICATION NO. : 15/935972
DATED : August 27, 2019
INVENTOR(S) : Kravets et al.

Page 1 of 1

It is certified that error appears in the above-identified patent and that said Letters Patent is hereby corrected as shown below:

In the Drawings

Drawing sheet 3 of 7, FIG. 2C, delete "202C" and insert -- 202B -- therefor.

In the Specification

Column 9, Line 41, delete "nth" and insert -- $n^{th}$ -- therefor.

Column 9, Line 43, delete "nth" and insert -- $n^{th}$ -- therefor.

Column 9, Line 56, delete "nth" and insert -- $n^{th}$ -- therefor.

Column 9, Line 57, delete "nth" and insert -- $n^{th}$ -- therefor.

Column 19, Line 21, delete "620" and insert -- 640 -- therefor.

In the Claims

Column 24, Line 59, Claim 19, after "wherein", delete "¶".

Signed and Sealed this
Tenth Day of March, 2020

Andrei Iancu
*Director of the United States Patent and Trademark Office*